US012548836B2

(12) United States Patent
Zhou et al.

(10) Patent No.: US 12,548,836 B2
(45) Date of Patent: Feb. 10, 2026

(54) DEEP-SEA BATTERY APPARATUS AND METHOD FOR ASSEMBLING DEEP-SEA BATTERY APPARATUS

(71) Applicant: EVE POWER CO., LTD., Guangdong (CN)

(72) Inventors: Jieyu Zhou, Guangdong (CN);
Zhongzhi Yuan, Guangdong (CN);
Pengcheng Liu, Guangdong (CN);
Xiaokang Li, Guangdong (CN);
Dongrong Qi, Guangdong (CN);
Zhimiao Li, Guangdong (CN);
Zhengguang Liu, Guangdong (CN);
Liesong Wu, Guangdong (CN);
Jianhua Liu, Guangdong (CN);
Jincheng Liu, Guangdong (CN)

(73) Assignee: EVE ENERGY CO., LTD., Guangdong (CN)

( * ) Notice: Subject to any disclaimer, the term of this patent is extended or adjusted under 35 U.S.C. 154(b) by 399 days.

(21) Appl. No.: 18/013,941

(22) PCT Filed: Dec. 15, 2020

(86) PCT No.: PCT/CN2020/136528
§ 371 (c)(1),
(2) Date: Dec. 30, 2022

(87) PCT Pub. No.: WO2022/110347
PCT Pub. Date: Jun. 2, 2022

(65) Prior Publication Data
US 2023/0291048 A1 Sep. 14, 2023

(30) Foreign Application Priority Data
Nov. 24, 2020 (CN) .......................... 202011334049.2

(51) Int. Cl.
*H01M 50/24* (2021.01)
*H01M 10/0525* (2010.01)
(Continued)

(52) U.S. Cl.
CPC ....... *H01M 50/24* (2021.01); *H01M 10/0525* (2013.01); *H01M 10/425* (2013.01);
(Continued)

(58) Field of Classification Search
None
See application file for complete search history.

(56) References Cited

U.S. PATENT DOCUMENTS 5,360,678 A * 11/1994 Spillman ........... H01M 50/3425
429/70

FOREIGN PATENT DOCUMENTS

| CN | 101804854 | 8/2010 |
| CN | 102637840 | 8/2012 |

(Continued)

OTHER PUBLICATIONS

State Intellectual Property Office of People's Republic of China, Notification of First Office Action for Application No. 202011334049. 2, report issue date Apr. 8, 2024, China.
(Continued)

*Primary Examiner* — Wyatt P McConnell
(74) *Attorney, Agent, or Firm* — McDonald Hopkins LLC (57) ABSTRACT

A deep-sea battery apparatus and a method for assembling the deep-sea battery apparatus. The deep-sea battery apparatus includes a casing, an upper cover), a battery pack, a pressure compensation assembly, and a fastening plate assembly. The upper cover is sealingly connected to a top of the casing, the battery pack is disposed inside the casing, the pressure compensation assembly is disposed in the casing and on a side of the battery pack, and the fastening plate
(Continued)

assembly is annular in shape and sealingly sleeved and connected at a connection between the casing and the upper cover.

18 Claims, 7 Drawing Sheets

(51) Int. Cl.
  *H01M 10/42* (2006.01)
  *H01M 50/211* (2021.01)
  *H01M 50/227* (2021.01)
  *H01M 50/262* (2021.01)
  *H01M 50/278* (2021.01)
  *H01M 50/287* (2021.01)
(52) U.S. Cl.
  CPC ....... *H01M 50/211* (2021.01); *H01M 50/227* (2021.01); *H01M 50/262* (2021.01); *H01M 50/278* (2021.01); *H01M 50/287* (2021.01); *H01M 2010/4271* (2013.01)

(56) References Cited

FOREIGN PATENT DOCUMENTS

| | | |
|---|---|---|
| CN | 202534715 | 11/2012 |
| CN | 203312394 | 11/2013 |
| CN | 103700793 | 4/2014 |
| CN | 109742270 | 5/2019 |
| CN | 210866321 | 6/2020 |
| CN | 111540850 | 8/2020 |
| CN | 214505641 | 10/2021 |

OTHER PUBLICATIONS

Patent Cooperation Treaty (PCT), International Search Report and Written Opinion for Application PCT/CN2020/136528 filed Dec. 15, 2020, mailed Aug. 2, 2021, International Searching Authority, CN.

* cited by examiner

DEEP-SEA BATTERY APPARATUS AND METHOD FOR ASSEMBLING DEEP-SEA BATTERY APPARATUS

CROSS-REFERENCE TO RELATED APPLICATIONS

This application is a U.S. National Stage Application filed under 35 U.S.C. 371 of International Patent Application No. PCT/CN2020/136528 filed on Dec. 15, 2020 which claims priority of Chinese Patent Application No. 202011334049.2 filed Nov. 24, 2020, the disclosures of which are incorporated herein by reference in their entireties.

TECHNICAL FIELD

The present application relates to the field of battery technology, for example, a deep-sea battery apparatus and a method for assembling the deep-sea battery apparatus.

BACKGROUND

At present, deep-sea equipment, such as a submersible, a deep submersible vehicle, and deep-sea life-saving equipment, is generally required to work in a deep-sea pressure environment of several hundred meters or even thousands of meters. As the equipment dives deeper, a battery pack is subjected to higher pressure. Current seawater-pressurized batteries are mostly made in a pressure compensation manner in the industry. A battery pack made in this manner should have relatively high specific energy, and a pressure-tolerated rage could be in all sea depths. However, existing pressurized batteries made in the pressure compensation manner mostly use split structures and have relatively poor sealability and relatively low specific energy.

SUMMARY

The present application provides a deep-sea battery apparatus and a method for assembling the deep-sea battery apparatus which has relatively high specific energy, a relatively high space utilization rate, and can significantly improve sealability and pressure tolerance.

An embodiment provides a deep-sea battery apparatus, which includes a casing, an upper cover, a battery pack, a pressure compensation assembly, and a fastening plate assembly. The upper cover is sealingly connected to a top of the casing. The battery pack is disposed inside the casing. The pressure compensation assembly is disposed in the casing and on a side of the battery pack. The fastening plate assembly is annular in shape and sealingly sleeved and connected at a connection between the casing and the upper cover.

An embodiment provides a method for assembling a deep-sea battery apparatus. The method is applied to the preceding deep-sea battery apparatus and includes: placing the battery pack and the pressure compensation assembly into the casing in parallel from the top of the casing; and placing the upper cover the top of the casing and connecting the fastening plate assembly at the connection between the casing and the upper cover.

REFERENCE LIST 1 casing
2 upper cover
21 sealing portion
22 annular slot
3 battery pack
31 pouch cell
32 upper holder
33 lower holder
34 printed circuit board (PCB) connection board
4 pressure compensation assembly
41 baffle plate
411 through hole
42 bladder
43 regulation valve cover
5 fastening plate assembly
51 outer fastening plate
52 inner fastening plate
53 bolt
6 sealing ring
7 battery management system
71 bracket
72 slave control board
73 master control board
8 oil fill port
9 communication interface
10 power supply interface
11 handle

DETAILED DESCRIPTION

In the description of the present application, terms "connected to each other", "connected", and "fixed" are to be understood in a broad sense unless otherwise expressly specified and limited. For example, the terms may refer to "securely connected", "detachably connected", or "integrated", may refer to "mechanically connected" or "electrically connected", may refer to "directly connected to each other" or "indirectly connected to each other through an intermediary", or may refer to "connected inside two elements" or an interaction relation between two elements. For those of ordinary skill in the art, specific meanings of the preceding terms in the present application may be understood based on specific situations.

In the present application, unless otherwise expressly specified and limited, when a first feature is "on" or "under" a second feature, the first feature and the second feature may be in direct contact or be in contact via another feature between the two features instead of being in direct contact. Moreover, when the first feature is "on", "above", or "over"

the second feature, the first feature is right on, above, or over the second feature, the first feature is obliquely on, above, or over the second feature, or the first feature is simply at a higher level than the second feature. When the first feature is "under", "below", or "underneath" the second feature, the first feature is right under, below, or underneath the second feature, the first feature is obliquely under, below, or underneath the second feature, or the first feature is simply at a lower level than the second feature.

In the description of this embodiment, orientations or position relations indicated by terms such as "upper", "lower", "left", and "right" are based on the drawings. These orientations or position relations are intended only to facilitate and simplify the description of operations and not to indicate or imply that a device or element referred to must have such particular orientations or must be configured or operated in such particular orientations. Thus, these orientations or position relations are not to be construed as limiting the present application. Additionally, terms "first" and "second" are used only for distinguishing descriptions and have no special meanings.

Figure 1:
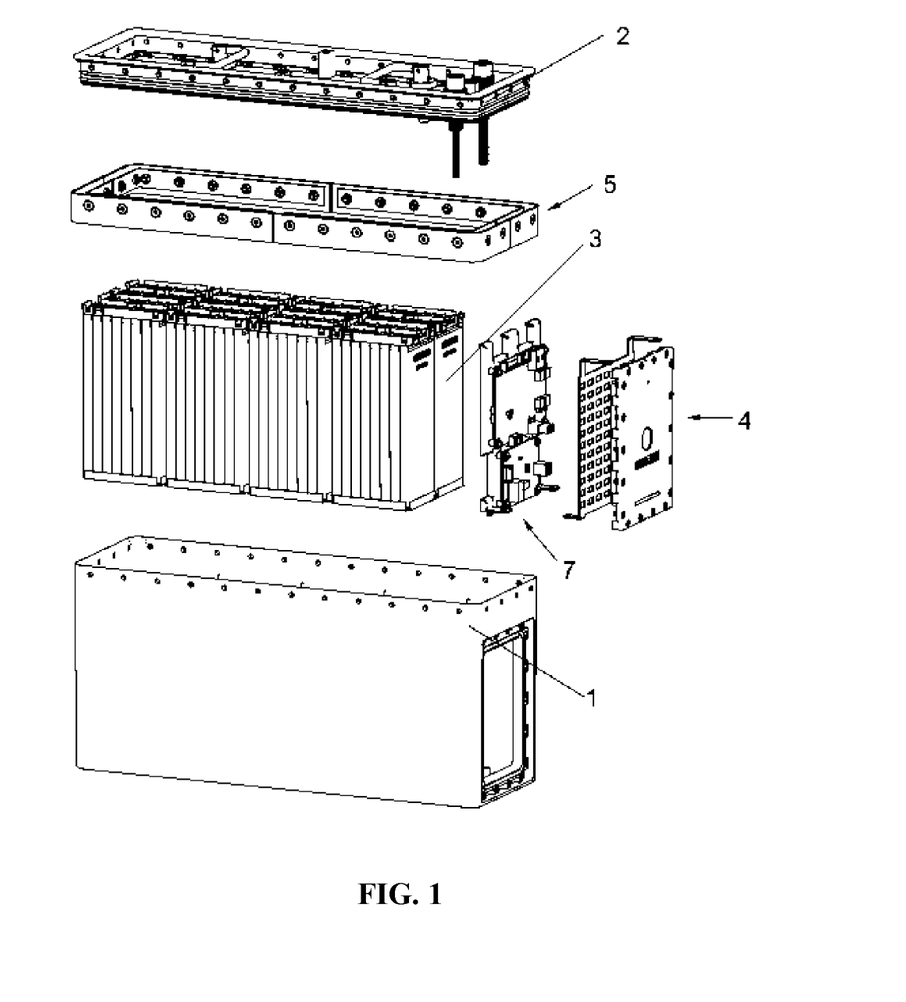
FIG. 1 is an exploded view of a deep-sea battery apparatus according to an embodiment of the present application.

As shown in FIG. 1, the embodiment provides a deep-sea battery apparatus, and the deep-sea battery apparatus includes a casing 1, an upper cover 2, a battery pack 3, a pressure compensation assembly 4, and a fastening plate assembly 5, where the upper cover 2 is sealingly connected to a top of the casing 1, the battery pack 3 is disposed inside the casing 1, the pressure compensation assembly 4 is disposed on a side of the battery pack 3 and sealingly connected to the casing 1, and the fastening plate assembly 5 is annular in shape and sealingly sleeved and connected at a connection between the casing 1 and the upper cover 2.

The deep-sea battery apparatus with the preceding structure is convenient to disassemble and assemble, and the annular fastening plate assembly 5 is sealingly sleeved and connected at the connection between the casing 1 and the upper cover 2 so that the casing 1 and the upper cover 2 are tightly connected, which is conducive to improving sealability and pressure tolerance.

In an example, the casing 1 is in the shape of a hollow cuboid, an opening is provided at a top end of the casing 1, and the upper cover 2 is sealingly connected to the opening at the top end of the casing 1. In an example, a port is provided at an end of the casing 1 having a smaller area, and the pressure compensation assembly 4 is sealingly connected to the port.

In an example, the upper cover 2 is detachably connected to the opening at the top end of the casing 1, and the pressure compensation assembly 4 is detachably connected to the port of the casing 1.

In an example, the battery pack 3 is also in the shape of a cuboid, and an end of the battery pack 3 from which tabs are led out is oriented to the top of the casing 1.

The battery pack 3 and the pressure compensation assembly 4 are disposed relative to the position of the casing 1, which is conducive to improving the specific energy and the space utilization rate of the battery apparatus.

In an example, the casing 1 and the upper cover 2 are made of high-molecular-weight polyethylene obtained through modification, that is, modified PE. The casing 1 and the upper cover 2 are made of the modified PE since the modified PE has stable chemical performance, resists to oil corrosion and seawater corrosion, is low in cost, and has a specific gravity of only 0.98 g/cm$^3$, so that the deep-sea battery apparatus can have a light overall weight and be suitable for a deep-sea working environment. The formulation of the modified PE may be determined according to actual situations. The thickness of the casing 1 is selectable from 3 mm to 5 mm. Due to a relatively small specific gravity of the modified PE, the deep-sea battery apparatus can tolerate a relatively large pressure without being damaged in the case of a relatively light weight, thereby improving the specific energy of the deep-sea battery apparatus.

Figure 2:
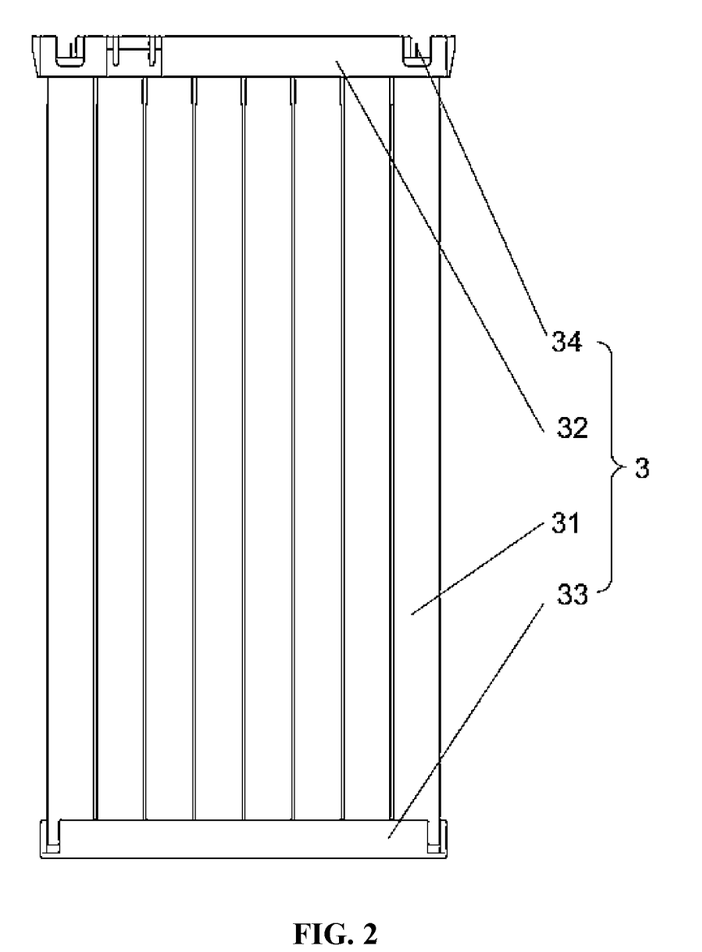
FIG. 2 is a structural view of a battery pack according to an embodiment of the present application.

As shown in FIG. 2, the battery pack 3 includes multiple unit batteries, and the multiple unit batteries are connected in series or in parallel into the battery pack 3 as needed. For example, each unit battery includes pouch cells 31, an upper holder 32, a lower holder 33, and a PCB connection board 34. The lower holder 33 is connected to the casing 1, and two ends of each pouch cell 31 are connected to the upper holder 32 and the lower holder 33, respectively. The upper holder 32 fixes the pouch cells 31 from an upper side and the lower holder 33 fixes the pouch cells 31 from a lower side. The PCB connection board 34 is connected to tabs of the pouch cells 31 to provide the pouch cells 31 with a position for an electrical connection. In an example, each pouch cell 31 employs a ternary pouch lithium-ion cell which is pressure-tolerable and has a high specific energy reaching up to 220 Wh/kg. In the embodiment, the pouch cells 31 are fixedly connected to the upper holder 32 and the lower holder 33 by a structural adhesive. The PCB connection board 34 is connected to the tabs by solder. In other embodiments, the PCB connection board 34 may be welded to the tabs in other manners such as electric resistance welding.

Figure 3:
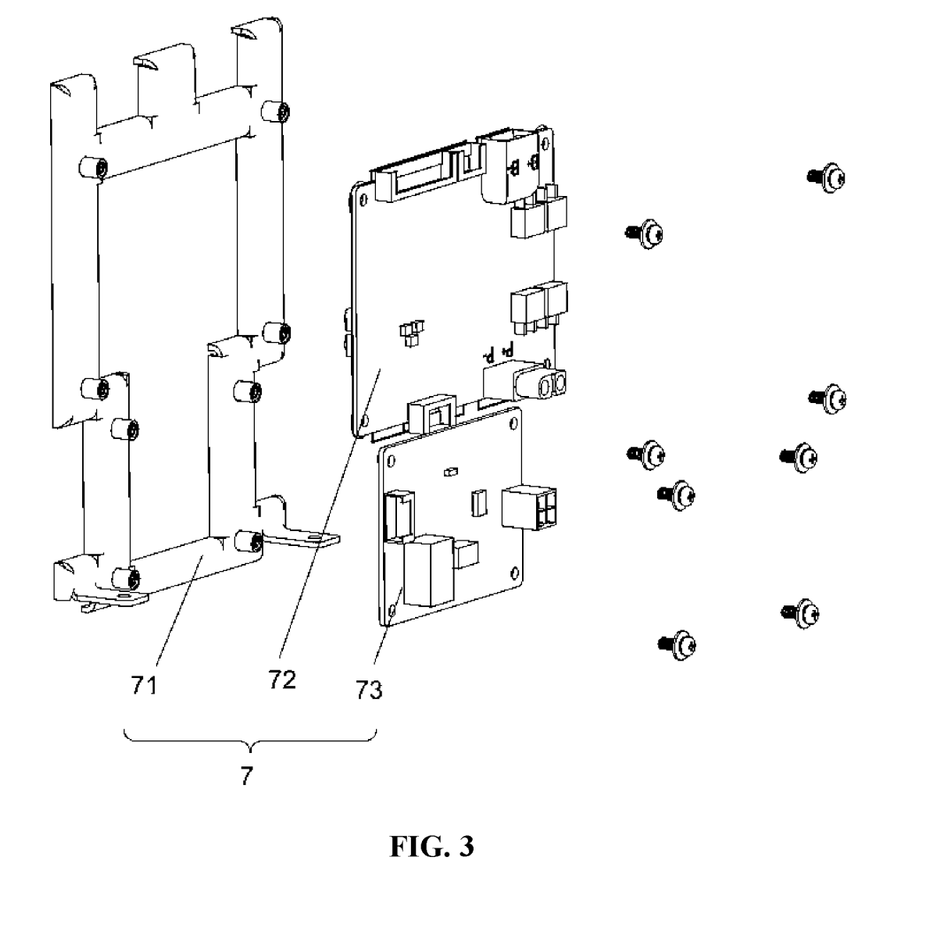
FIG. 3 is a structural view of a battery management system according to an embodiment of the present application.

As shown in FIGS. 1 and 3, the deep-sea battery apparatus further includes a battery management system 7 disposed in the casing 1 and between the battery pack 3 and the pressure compensation assembly 4. In an example, the battery management system 7 employs a master-slave split structure and is not limited to a master-slave integrated management system. The battery management system 7 has functions such as temperature acquisition, voltage and current acquisition, charge equalization, communication, and the prevention of a short circuit, overcharge, and overdischarge of the battery. For example, the battery management system 7 includes a bracket 71, a slave control board 72, and a master control board 73, where the bracket 71 is connected to the casing 1, the slave control board 72 is fixed to the bracket 71 by screws, and the master control board 73 is fixed to the bracket 71 by screws and positioned below the slave control board 72. The bracket 71 provides positions for fixing and mounting the master control board 73 and the slave control board 72. The slave control board 72 provides the battery pack 3 with functions such as voltage acquisition and temperature acquisition, and the master control board 73 provides the battery pack 3 with functions such as data processing, communication, and protection. In an example, the bracket 71 is provided with a groove, and the master control board 73 and the slave control board 72 are spaced apart in the groove so that the master control board 73 and the slave control board 72 are more stable and compact.

Figure 4:
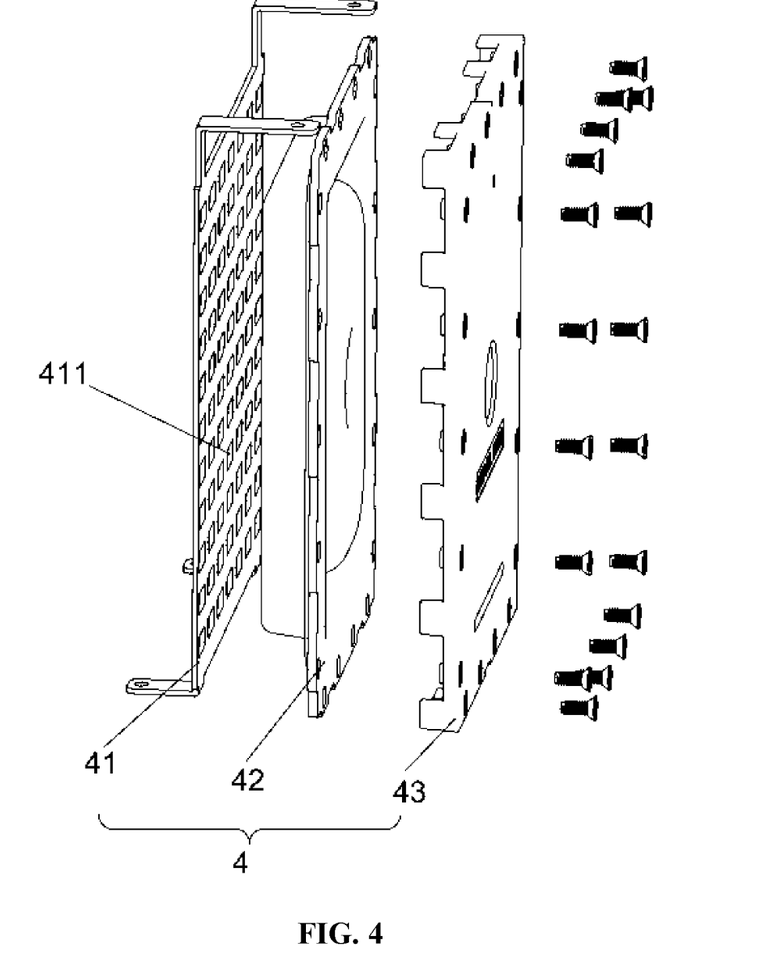
FIG. 4 is a structural view of a pressure compensation assembly according to an embodiment of the present application.

As shown in FIGS. 1 and 4, the pressure compensation assembly 4 provides the battery pack 3 with pressure regulation so that the device can normally provide energy for deep-sea equipment in the deep sea. In an example, the pressure compensation assembly 4 includes a baffle plate 41, a bladder 42, and a regulation valve cover 43, where the bladder 42 is disposed between the baffle plate 41 and the regulation valve cover 43, the baffle plate 41 is connected to the casing 1 by screws and disposed between the battery management system 7 and the bladder 42, and the regulation valve cover 43 is sealingly connected to the port of the casing 1 and connected to the bladder 42 by the screws. For example, a sealing slot is provided at the port of the casing 1, a sealing rib is provided on the bladder 42, raised ribs are provided on the regulation valve cover 43, and the sealing rib, the port of the casing 1 and the raised ribs on the regulation valve cover 43 together form a sealing body to prevent seawater from penetrating into the casing 1.

In an example, a circular hole is provided in the middle of the regulation valve cover 43, through which seawater acts on the bladder 42 so that the bladder 42 can deform in a designed direction. The baffle plate 41 is selectable to be a metal baffle plate which can prevent the bladder 42 from being in contact with the battery management system 7 during the bladder 42 expanding, thereby protecting the bladder 42 for safe use with designed working values. The baffle plate 41 is provided with multiple through holes 411 that are uniformly distributed, which can reduce a weight and improve the flowability of pressure oil. The regulation valve cover 43 may be a metal cover and has the functions of fixing and protecting the bladder 42. In the embodiment, the bladder 42 is made of nitrile rubber (NBR). The NBR has good oil resistance, good wear resistance, and relatively good heat resistance. In other embodiments, the bladder 42 may be made of different materials according to actual situations.

Figure 5:
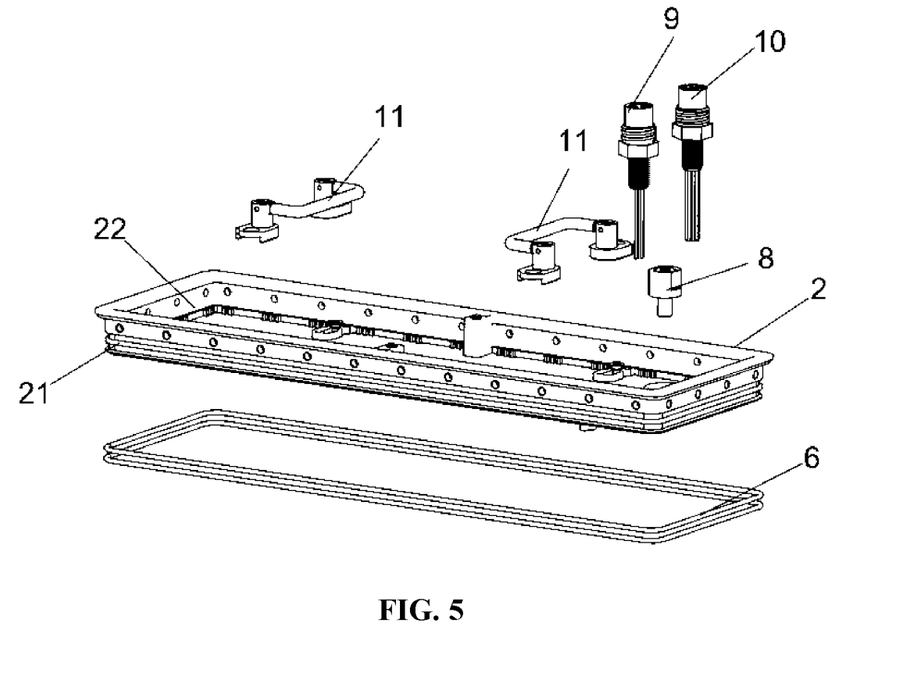
FIG. 5 is a structural view of an upper cover according to an embodiment of the present application.

As shown in FIG. 5, the deep-sea battery apparatus further includes an oil fill port 8, a communication interface 9, and a power supply interface 10. The oil fill port 8 is fixedly connected to the upper cover 2 by a nut. To improve sealability, a sealing ring is provided at a connection between the oil fill port 8 and the upper cover 2. The oil fill port 8 is an inlet for filling the pressure oil, and an upper end of the oil fill port 8 is connected to an oil fill cover. In an example, the pressure oil employs 25# transformer oil which has better insulation performance. In other embodiments, another pressure oil or silicone oil may be employed. The communication interface 9 is a watertight joint for communication between the battery pack 3 and the deep-sea equipment and the communication interface 9 is fixedly connected to the upper cover 2 by a nut. The power supply interface 10 is a watertight joint for the power output and input of the battery pack 3 and the power supply interface 10 is fixedly connected to the upper cover 2 by a nut. Sealing rings are respectively provided at a connection between the communication interface 9 and the upper cover 2 and at a connection between the power supply interface 10 and the upper cover 2.

To be convenient to move the deep-sea battery apparatus, the deep-sea battery apparatus further includes a handle 11, where the handle 11 is threadedly connected to the upper cover 2. The handle 11 may be configured to be foldable or erectable. When the deep-sea battery apparatus does not need to be moved, the handle 11 may be folded to save space and providing a relatively smooth surface for the deep-sea battery apparatus. Two handles 11 may be provided, which are spaced apart in a length direction of the upper cover 2. In other embodiments, one handle 11 may be provided or three or more handles 11 may be provided.

After the battery pack 3, the battery management system 7, and the pressure compensation assembly 4 are all mounted to the casing 1, the upper cover 2 is sealingly connected to the casing 1. To prevent seawater from entering interior of the deep-sea battery apparatus, the deep-sea battery apparatus further includes a sealing ring 6 disposed at the connection between the casing 1 and the upper cover 2. For example, referring to FIG. 5, the upper cover 2 is provided with an annular sealing portion 21 extending downwards, where the sealing portion 21 is formed with an annular sealing slot and the sealing ring 6 is tightly sleeved in the sealing slot. In an example, the sealing ring 6 is a double-layer sealing ring in O-shaped, thereby improving the sealability of the connection between the casing 1 and the upper cover 2. In an example, the sealing ring 6 is made of NBR. In other embodiments, the material and shape of the sealing ring 6 may be determined according to actual situations.

Figure 6:
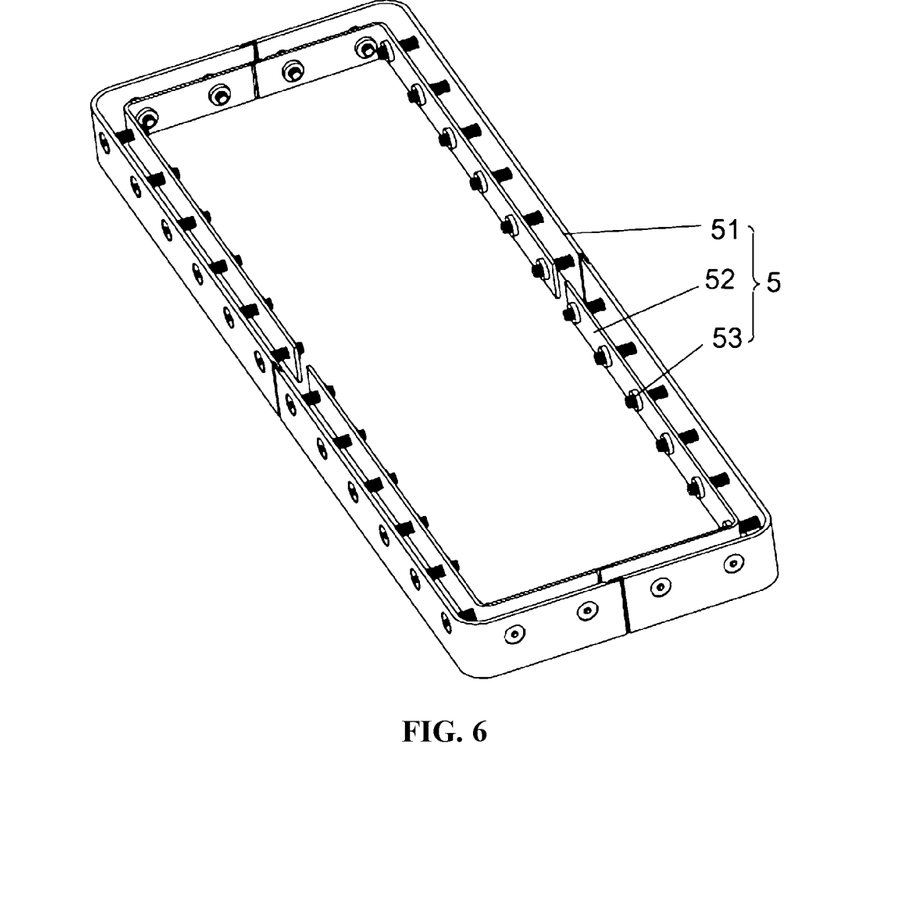
FIG. 6 is a structural view of a fastening plate assembly according to an embodiment of the present application.
Figure 7:
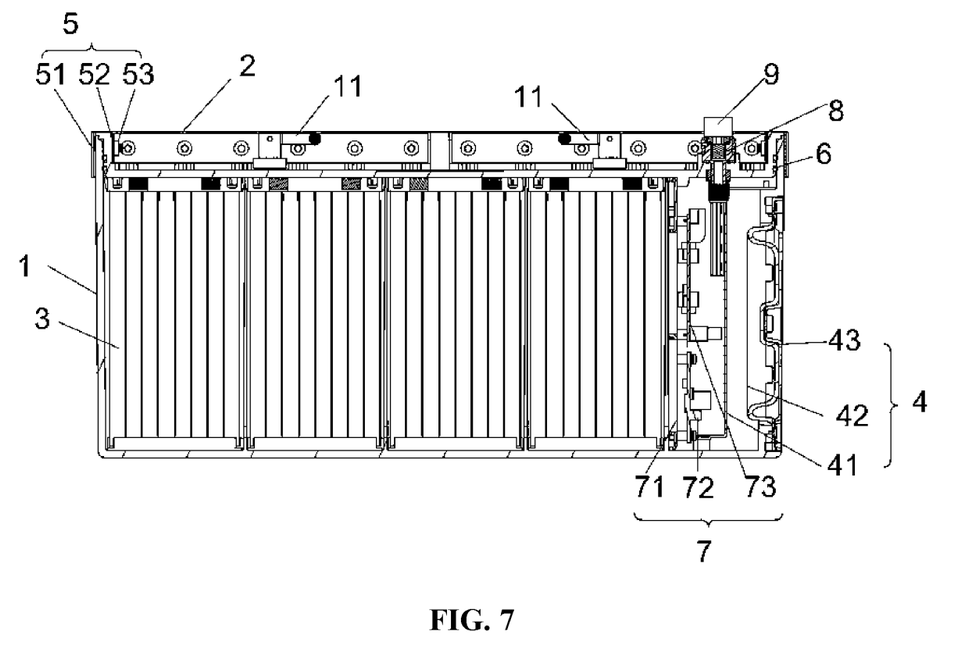
FIG. 7 is a structural view of an assembled deep-sea battery apparatus according to an embodiment of the present application.

As shown in FIGS. 5, 6, and 7, the upper cover 2 is provided with an annular slot 22 at an upper end of the upper cover 2. Since the casing 1 and the upper cover 2 are made of the modified PE and have certain elasticity, in case of uneven pressure, part of the casing 1 or the upper cover 2 may be recessed and a gap appears at the connection between the casing 1 and the upper cover 2, and thus seawater enters the casing 1. Therefore, the fastening plate assembly 5 is further provided at the connection between the casing 1 and the upper cover 2 to improve the sealability of the connection between the casing 1 and the upper cover 2. When the upper cover 2 is placed above the casing 1, the sealing ring 6 and the casing 1 form double side sealing, and the fastening plate assembly 5 strengthens the sealing, so as to form an effective sealing body. The fastening plate assembly 5 includes an outer fastening plate 51, an inner fastening plate 52, and bolts 53. The inner fastening plate 52 is annular and disposed in the annular slot 22 of the upper cover 2, and the inner fastening plate 52 is adapted to the annular slot 22 in shape for convenient mounting. The outer fastening plate 51 is annular and sleeved on the periphery of the casing 1. The outer fastening plate 51 and the inner fastening plate 52 are arranged in parallel, and the bolts 53 are threadedly connected to the outer fastening plate 51, the casing 1, walls of the annular slot 22, and the inner fastening plate 52 in sequence, so as to tighten the connection between the casing 1 and the upper cover 2.

In an example, the outer fastening plate 51 and the inner fastening plate 52 are made of metal so that the casing 1 and the upper cover 2 are connected more tightly and the connection between the casing 1 and the upper cover 2 is not easy to deform to prevent water leakage. In the embodiment, the outer fastening plate 51 and the inner fastening plate 52 are made of stainless steel 316 which has strong corrosion resistance. In other embodiments, the outer fastening plate 51 and the inner fastening plate 52 may be made of other materials. In an example, multiple bolts 53 are provided and uniformly distributed at equal intervals in a peripheral direction of the outer fastening plate 51 so that the connection between the casing 1 and the upper cover 2 is evenly stressed, thereby improving the tightness and sealability of the connection between the casing 1 and the upper cover 2. Each bolt 53 may employ an ultra-thin inner hex screw which has a relatively large fastening force. The bolt 53 may also have other specifications and shapes.

The deep-sea battery apparatus provided in the embodiment can effectively solve the problems of low specific energy and a low space utilization rate of a battery pack made in a pressure compensation manner. The deep-sea battery apparatus can increase the specific energy of the battery pack to 135 Wh/Kg and increase the space utilization rate to 65% and is applicable to a deep-sea environment of 3000 meters as for a working depth.

A method for assembling the deep-sea battery apparatus is described below. The battery pack 3, the battery management system 7, the baffle plate 41, and the bladder 42 are placed into the casing 1 in parallel from the top of the casing 1. The regulation valve cover 43 is placed at the port of the casing 1, and the regulation valve cover 43 and the bladder 42 are connected at the port of the casing 1 by the screws.

The upper cover 2 is placed at the top of the casing 1, the inner fastening plate 52 is placed on the upper cover 2, and the outer fastening plate 51 is sleeved at the connection between the casing 1 and the upper cover 2; and the outer fastening plate 51, the casing 1, the upper cover 2, and the inner fastening plate 52 are fixed by the bolts 53.

The deep-sea battery apparatus is assembled by the preceding method so that the deep-sea battery apparatus has relatively high specific energy, a relatively high space utilization rate, and good sealability and pressure tolerance.

The present application provides the deep-sea battery apparatus and the method for assembling the deep-sea battery apparatus. The deep-sea battery apparatus includes the casing 1, the upper cover 2, the battery pack 3, the pressure compensation assembly 4, and the fastening plate assembly 5. The battery pack 3 is disposed inside the casing 1, the pressure compensation assembly 4 is disposed on one side of the battery pack 3 and sealingly connected to the casing 1, and the upper cover 2 is sealed at the top of the casing 1, so that the deep-sea battery apparatus is simple in structure and convenient to be assembled, the deep-sea battery apparatus has relatively high specific energy, a relatively high space utilization rate, and the deep-sea battery apparatus has significantly improved sealability and pressure tolerance. The annular fastening plate assembly 5 is sealingly sleeved and connected at the connection between the casing 1 and the upper cover 2 so that the casing 1 and the upper cover 2 are tightly connected, improving the sealability of the deep-sea battery apparatus and thus improving the pressure tolerance.

What is claimed is:

1. A deep-sea battery apparatus, comprising:
    a casing;
    an upper cover sealingly connected to a top of the casing;
    a battery pack disposed inside the casing;
    a pressure compensation assembly disposed in the casing and on a side of the battery pack; and
    a fastening plate assembly annular in shape and sealingly sleeved and connected at a connection between the casing and the upper cover.

2. The deep-sea battery apparatus according to claim 1, wherein tabs of the battery pack are oriented to the top of the casing.

3. The deep-sea battery apparatus according to claim 1 or 2, wherein the casing is in a shape of a cuboid, the upper cover is sealingly connected to the top of the casing, the pressure compensation assembly is sealingly connected to an end of the casing, and the top of the casing has a larger area than the end of the casing.

4. The deep-sea battery apparatus according to claim 1, wherein
    the upper cover is provided with an annular sealing portion extending downwards and the upper cover has an annular slot at an upper end of the upper cover; and
    the fastening plate assembly comprises an outer fastening plate, an inner fastening plate and bolts, wherein the inner fastening plate is disposed in the annular slot, the outer fastening plate is sleeved at the connection between the casing and the upper cover, and the bolts are threadedly connected to the outer fastening plate, the casing, the upper cover, and the inner fastening plate in sequence.

5. The deep-sea battery apparatus according to claim 1, further comprising:
    a sealing ring disposed at the connection between the casing and the upper cover.

6. The deep-sea battery apparatus according to claim 5, wherein the sealing ring is a double-layer sealing ring.

7. The deep-sea battery apparatus according to claim 1, wherein the casing and the upper cover are made of modified polyethylene (PE).

8. The deep-sea battery apparatus according to claim 1, further comprising:
    a battery management system disposed in the casing and between the battery pack and the pressure compensation assembly.

9. The deep-sea battery apparatus according to claim 8, wherein the pressure compensation assembly comprises:
    a baffle plate, a bladder, and a regulation valve cover, wherein the bladder is disposed between the baffle plate and the regulation valve cover, the baffle plate is connected to the casing and disposed between the battery management system and the bladder, and the regulation valve cover is sealingly connected to the casing.

10. The deep-sea battery apparatus according to claim 9, wherein the regulation valve cover and the bladder are connected to the casing by screws.

11. The deep-sea battery apparatus according to claim 9, wherein the baffle plate is provided with a plurality of through holes that are uniformly distributed.

12. The deep-sea battery apparatus according to claim 8, wherein the battery management system comprises:
    a bracket, a slave control board, and a master control board, wherein the bracket is connected to the casing, the slave control board is fixed to the bracket, and the master control board is fixed to the bracket and disposed below the slave control board.

13. The deep-sea battery apparatus according to claim 1, wherein the battery pack comprises a plurality of unit batteries, each of which comprises pouch cells that are ternary pouch lithium-ion cells.

14. A method for assembling a deep-sea battery apparatus, the method being applied to the deep-sea battery apparatus according to claim 1 and comprising:
    placing the battery pack and the pressure compensation assembly into the casing in parallel from the top of the casing; and
    placing the upper cover at the top of the casing and connecting the fastening plate assembly at the connection between the casing and the upper cover.

15. A method for assembling a deep-sea battery apparatus, the method being applied to the deep-sea battery apparatus according to claim 2 and comprising:
    placing the battery pack and the pressure compensation assembly into the casing in parallel from the top of the casing; and
    placing the upper cover at the top of the casing and connecting the fastening plate assembly at the connection between the casing and the upper cover.

16. A method for assembling a deep-sea battery apparatus, the method being applied to the deep-sea battery apparatus according to claim 3 and comprising:
    placing the battery pack and the pressure compensation assembly into the casing in parallel from the top of the casing; and
    placing the upper cover at the top of the casing and connecting the fastening plate assembly at the connection between the casing and the upper cover.

17. A method for assembling a deep-sea battery apparatus, the method being applied to the deep-sea battery apparatus according to claim 4 and comprising:

placing the battery pack and the pressure compensation assembly into the casing in parallel from the top of the casing; and placing the upper cover at the top of the casing, placing the inner fastening plate on the upper cover, sleeving the outer fastening plate at the connection between the casing and the upper cover, and fixing the outer fastening plate, the casing, the upper cover, and the inner fastening plate by the bolts.

18. A method for assembling a deep-sea battery apparatus, the method being applied to the deep-sea battery apparatus according to claim 9 and comprising:

placing the battery pack, the battery management system, the baffle plate, and the bladder into the casing in parallel from the top of the casing, placing the regulation valve cover at a port of the casing, and connecting the regulation valve cover and the bladder at the port of the casing by the screws; and placing the upper cover at the top of the casing, placing the inner fastening plate on the upper cover, sleeving the outer fastening plate at the connection between the casing and the upper cover, and fixing the outer fastening plate, the casing, the upper cover, and the inner fastening plate by the bolts.

* * * * *